Patented July 15, 1924.

1,501,206

UNITED STATES PATENT OFFICE.

HENRY DREYFUS, OF LONDON, ENGLAND.

PLASTIC CONTAINING CELLULOSE ACETATE.

No Drawing.     Application filed August 5, 1920. Serial No. 401,380.

*To all whom it may concern:*

Be it known that I, HENRY DREYFUS, a citizen of the Swiss Republic, residing at London, England, have invented certain new and useful Improvements in Plastics Containing Cellulose Acetate, of which the following is a specification.

This invention relates to the manufacture of solutions, celluloid-like masses, films, dopes, artificial silk or other compositions, preparations, or articles (hereinafter included in the term "compositions of matter") having a basis of cellulose acetate, and is characterized by the employment or application of certain new or improved high-boiling solvents or plasticising agents in and for such solutions, compositions, preparations or products hereinafter and in the claiming clauses included in the term "composition of matter."

In addition to the volatile solvents or diluents, such for instance as acetone, alcohol-benzene mixtures, methyl acetate and so forth, which are generally used in making solutions or other products such as referred to, or in some cases even without such volatile solvents or diluents, it is necessary to employ solvents or plasticising agents of higher boiling points.

These latter play an important part, and have to fulfill numerous requirements for use in the art. Besides having a high boiling point they must be liquids or jellies at ordinary temperature or even when cooled down to low temperature, this latter being especially the case for uses where the solutions, compositions or preparations are exposed to low temperatures in service, as in the case of aircraft dopes, outdoor coatings and so forth. Also the high boiling solvents must be insoluble or very little soluble in water.

In the specification of a previous U. S. Patent No. 1,353,384 filed 15th April, 1919, I have described the employment as high boiling plasticising solvents for cellulose acetate, of high boiling mixtures of isomeric xylene low-carbon-alkyl sulphonamides, which mixtures are liquid at ordinary temperature, and are such as can be obtained by treating an ordinary commercial xylene containing *o*, *m* and *p*-xylenes, by the ordinary methods of conversion into the alkyl sulphonamides, for example by treating the crude xylene with chlorosulphonic acid to form the corresponding sulphochlorides, and then with ammonia to convert these into the sulphonamides and then methylating same to the mono or dimethyl stage or ethylating to the mono ethyl stage; or by treating the said mixed sulphochlorides with amines such as methylamine, ethylamine, etc.

In the specification of another U. S. Patent No. 1,353,385, filed 15th April, 1919, I have described the employment as high boiling plasticising solvents for cellulose acetate, of high boiling mixtures containing ortho and para toluene low-carbon-alkyl sulphonamides, which mixtures are liquid at ordinary temperature and are such as can be obtained on treating commercial toluene by the ordinary methods of conversion into the alkyl sulphonamides, for example by treating the toluene with chlorosulphonic acid to form the corresponding sulpho-chlorides, treating the resulting raw mixture with ammonia to convert the sulphochlorides into sulphonamides, and then methylating or ethylating to the monomethyl or monoethyl stage; or by treating the said raw mixture with amines such as methylamine, ethylamine, etc.

The present invention is characterized by the employment as plasticising agents for the purpose mentioned, of certain high boiling benzene low carbon alkyl sulphonamide preparation which are liquids at ordinary temperature and form jellies at temperatures considerably below ordinary room temperatures, viz:—

(*a*) *Benzene monomethyl sulphonamide.*—This is an excellent high boiling plasticising solvent for cellulose acetate. This substance boils at about 180° C. under 1-2 mm. pressure, is liquid at ordinary temperature and forms a clear, soft jelly at —15° C. It gives clear solutions of cellulose acetate even at low temperatures.

(*b*) *Benzene methyl ethyl sulphonamide.*—This substance boils at about 170°–175° C. under 1-2 mm. pressure, is liquid at ordinary temperature and forms a soft turbid jelly at —25° C.

It has been found that for some applications the benzene dialkylated sulphonamide derivative is not so good as the benzene mono methyl sulphonamide derivative or as the mono alkylated sulphonamide derivatives of my said U. S. Patents No. 1,353,384 and No. 1,353,385, as the cellulose acetate solutions made therewith tend to become somewhat turbid when cooled down to or below ordinary temperature. Where this is not objectionable the dialkylated derivative may even be used alone, but it may be used together with the mono alkylated sulphonamide derivative of the present invention or my said specifications 1,353,384 and 1,353,385 to obtain solutions which remain clear when cooled down, or together with any other suitable high boiling solvents of cellulose acetate.

In preparing the said benzene methyl sulphonamide derivative ordinary commercial benzene was used, for example an impure benzene distilling between 79°–88° C. (90% going over at about 78°–80° C.).

I do not, however, confine myself to working with this particular grade of the hydrocarbon. For example pure benzene may be used for the benzene methyl sulphonamide.

The procedure followed for preparing the alkyl sulphonamide products of the present invention may be according to the ordinary methods of preparing such alkylated compounds via the sulphochlorides, these either being treated with ammonia and then alkylated with appropriate alkylating agent such as dimethyl sulphate or ethyl sulphuric acid salt or chlorethyl, etc., or being treated direct with amines such as methylamine, ethylamine, etc.

It will be understood that in cases where the commercial or impure hydrocarbon is indicated above as having been used, the treatment was carried out thereon without separation or purification of the intermediate or final products, though I do not confine myself in this respect.

It is however to be understood that I do not limit myself to the particular procedure indicated for the preparation of the alkyl sulphonamides of the present invention and that any other methods giving substantially similar products may be employed.

The high boiling plasticising solvents of the present invention may be employed in any suitable proportions, such for example as those indicated in my said specification No. 1,353,384.

Similarly to the alkylated sulphonamides specified in my said previous patents, the new solvents of the present invention may be employed with any usual or suitable solvents or liquids of low boiling point; likewise any other usual or suitable substances may be added, such as triphenyl phosphate, tricresylphosphate or similarly acting agents, or acid neutralizing aliphatic derivatives of urea which are liquid or have a low melting point, such as mono-, di- or tri-methyl urea or mono-, di- or tri-ethyl urea and so forth.

Also in making the solutions, compositions, or preparations with the solvents of the present invention any of the high boiling solvents of my application Serial No. 624,805, and Serial No. 624,806, filed March 13, 1923, which are divisions hereof, may be added any other high boiling solvents or softening or plasticising substances may be added which are liquid substances, or even solid substances, provided they give liquid, gelatinous or non-solid mixtures with the solvents of the invention.

In order to illustrate by way of example how the invention may be carried out in practice, one may use to 100 kilos of a highly viscous cellulose acetate, about 25 kilos of any of the benzene alkyl sulphonamide derivatives of the present invention or of mixtures of them, or of any of them with alkyl sulphonamide derivatives of my said previous specifications, and about 12 kilos of tricresylphosphate or triphenyl phosphate, these substances being mixed together with solvents of low boiling point such as acetone, methyl acetate or ethyl acetate mixed with alcohol (four volumes to one volume of alcohol), the mass being worked in the ordinary way in celluloid apparatus, first in the mixers, then on the rollers and afterwards in the presses, and so on, as generally practised in the celluloid industry. This gives quite a hard, incombustible celluloid-like product.

The quantity of about 25 kilos of the alkyl sulphonamide solvents may be reduced together with that of the triphenyl-phosphate or tricresylphosphate in order to get a still harder product if desired.

On the other hand, by increasing this quantity of the sulphonamide solvents one gets softer products in proportion as the quantity is increased until a product is obtained which is pliable like a fabric.

For example, if one takes to 100 kilos of cellulose acetate about 100 kilos of one of the high boiling plasticising solvents of the present invention (or of a mixture of them) then one gets the kind of product which is pliable like a fabric, and if the plasticising solvent is employed in quantities less than 100 per cent reckoned on the weight of the cellulose acetate, a proportionately stiffer product is obtained according as the quantity of the plasticising solvent is reduced, whilst if the quantity of the plasticising solvent is increased above 100 per cent calculated on the weight of the cellulose acetate, a still more pliable product is obtained.

As stated in my British specification No. 114,304, the higher the viscosity of the cellulose acetate the greater the quantity of the high boiling plasticising solvent which can be used, and the less the viscosity of the cellulose acetate the smaller the quantity of the high boiling plasticising solvent which can be used.

Colouring matters, filling materials and any other usual or suitable materials such as commonly employed in the art may of course be added in making solutions, compositions or other products according to the invention.

What I claim and desire to secure by Letters Patent is:—

1. A composition of matter containing cellulose acetate and benzene alkyl sulphonamide which is liquid at ordinary temperature and forms a jelly at low temperatures.

2. A composition of matter containing cellulose acetate and benzene monomethyl sulphonamide.

3. A composition of matter comprising cellulose acetate and a plasticising agent comprising benzene alkyl sulfonamid, which sulfonamid is liquid at ordinary room temperature and which further is a jelly at temperatures somewhat below 0° C. and which sulfonamid is a solvent of cellulose acetate at all temperatures below the boiling point of said sulfonamid.

4. A composition of matter comprising cellulose acetate and benzene monoalkyl sulfonamide which is liquid at ordinary temperature and forms a jelly at low temperatures.

In testimony whereof I have hereunto subscribed my name.

HENRY DREYFUS.